(12) United States Patent
Raghunandan

(10) Patent No.: US 7,065,550 B2
(45) Date of Patent: Jun. 20, 2006

(54) INFORMATION PROVISION OVER A NETWORK BASED ON A USER'S PROFILE

(75) Inventor: Hulikunta Prahlad Raghunandan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 809 days.

(21) Appl. No.: 09/782,933

(22) Filed: Feb. 14, 2001

(65) Prior Publication Data

US 2002/0111994 A1 Aug. 15, 2002

(51) Int. Cl.
*G06F 15/16* (2006.01)
*G07G 1/00* (2006.01)
*G07G 1/14* (2006.01)

(52) U.S. Cl. .................... 709/203; 709/206; 705/14
(58) Field of Classification Search .............. 709/201, 709/203; 705/14
See application file for complete search history.

(56) References Cited

U.S. PATENT DOCUMENTS

| 4,455,083 | A | | 6/1984 | Elmes | |
|---|---|---|---|---|---|
| 5,604,542 | A | * | 2/1997 | Dedrick | 348/552 |
| 5,754,939 | A | * | 5/1998 | Herz et al. | 455/3.04 |
| 5,796,952 | A | * | 8/1998 | Davis et al. | 709/224 |
| 5,855,008 | A | * | 12/1998 | Goldhaber et al. | 705/14 |
| 5,931,907 | A | * | 8/1999 | Davies et al. | 709/218 |
| 5,933,811 | A | * | 8/1999 | Angles et al. | 705/14 |
| 5,948,061 | A | * | 9/1999 | Merriman et al. | 709/219 |
| 5,991,735 | A | * | 11/1999 | Gerace | 705/10 |
| 6,009,410 | A | * | 12/1999 | LeMole et al. | 705/14 |
| 6,026,368 | A | * | 2/2000 | Brown et al. | 705/14 |
| 6,279,112 | B1 | * | 8/2001 | O'Toole et al. | 705/14 |
| 6,484,148 | B1 | * | 11/2002 | Boyd | 705/14 |
| 6,725,303 | B1 | * | 4/2004 | Hoguta et al. | 709/227 |
| 2001/0011226 | A1 | * | 8/2001 | Greer et al. | 705/14 |
| 2002/0099812 | A1 | * | 7/2002 | Davis et al. | 709/224 |
| 2002/0103811 | A1 | * | 8/2002 | Fankhauser et al. | 707/104.1 |
| 2002/0152126 | A1 | * | 10/2002 | Lieu et al. | 709/203 |
| 2003/0135853 | A1 | * | 7/2003 | Goldman et al. | 725/34 |

FOREIGN PATENT DOCUMENTS

GB 2346239 A * 1/2000

* cited by examiner

*Primary Examiner*—Zarni Maung
*Assistant Examiner*—Hassan Phillips
(74) *Attorney, Agent, or Firm*—Schmeiser, Olsen & Watts; William H. Steinberg

(57) ABSTRACT

A method, apparatus and product for providing information via a public network, such as the Internet, is disclosed. A user is firstly identified, and profile data is acquired based on that person's usage history. Information, obtained via a public network, is provided to the user based on the profile. The user can either be identified specifically, or as a member of one or more demographic groups. In relation to the latter, attributes in the user profile may include the user's age group, education and occupation/profession. The user profile may optionally include a weighting for each topic of interest. If the user is identified specifically, advertising to be displayed on the Internet may be matched with the current user's profile so that the advertising provided might appeal directly to the user. If the user is identified as a member of a demographic, web sites that match the demographic can be served.

19 Claims, 5 Drawing Sheets

| PROFILE TRAITS | ATTRIBUTES | PROFILE ATTRIBUTES VALUES | SESSION ATTRIBUTE VALUES | | | | |
|---|---|---|---|---|---|---|---|
| | | | S1 | S2 | S3 | S4 | S5 |
| ECONOMIC STRATA | VERY HIGH | 1 | 1 | 1 | | | |
| | HIGH | 4 | | 4 | 5 | 6 | |
| | MEDIUM | 9 | 9 | 9 | 9 | | |
| | LOW | 2 | | | | 1 | 1 |
| | VERY LOW | 1 | | | | | 1 |
| AGE GROUP | CHILD | 2 | 2 | 2 | 2 | | |
| | TEENAGER | 3 | 5 | 3 | 1 | 4 | 2 |
| | ADULT | 8 | 9 | 9 | 7 | 8 | 8 |
| | SENIOR CITIZEN | 7 | | 7 | 7 | 7 | |
| GENDER | MALE | 4 | | 4 | 4 | | |
| | FEMALE | 8 | 9 | 8 | 9 | 8 | 7 |
| EDUCATIONAL BACKGROUND | HIGH SCHOOL | 2 | 1 | 2 | 3 | 2 | |
| | COLLEGE | 3 | 2 | 3 | 3 | 3 | 3 |
| | UNDER GRADUATE | 6 | 7 | 8 | 5 | 6 | 4 |
| | GRADUATE | 5 | 6 | 5 | | 5 | |
| | POST GRADUATE | 4 | 2 | 5 | 4 | 4 | |
| TECHNICAL INTEREST | BASIC SCIENCES | 4 | 4 | 5 | 2 | 3 | |
| | ENGINEERING SCIENCES | 5 | 3 | 6 | 5 | 6 | 5 |
| | SOCIAL SCIENCES | 1 | | | | 1 | 1 |
| | HISTORY GEOGRAPHY | 1 | 1 | 1 | | | |
| PROFESSION | EMPLOYEE IN PRIVATE FIRM | 8 | 8 | 8 | 7 | 9 | |
| | GOVT. EMPLOYEE | 4 | 7 | 4 | 4 | 3 | 5 |
| | FREE LANCER | 4 | 4 | 4 | 4 | 4 | |
| | OWN BUSINESS | 5 | | | | 5 | 5 |
| SPECIAL INTERESTS | MOVIES | 9 | 9 | | 9 | 9 | 9 |
| | MUSIC | 8 | | 8 | 8 | 8 | 6 |
| | SPORT | 7 | 7 | | 7 | 7 | |
| | STAMPS | 1 | 1 | | | | |
| | COINS | 2 | | 2 | 2 | | |
| | PAINTINGS | 8 | | | 8 | 8 | 8 |
| | TRAVEL | 7 | | 7 | 9 | 8 | 2 |
| | PHOTOGRAPHY | 9 | 8 | 9 | 9 | 8 | 9 |

FIG.3

| KEYWORDS | TIME SPENT | ATTRIBUTE | SESSION ATTRIBUTE VALUE |
|---|---|---|---|
| CAMERA | 5 OF 15 MINUTES | PHOTOGRAPHY | 6 |
| TOM CRUISE | 10 OF 15 MINUTES | MOVIES | 9 |
| MARADONA | 7 OF 15 MINUTES | SPORT | 7 |
| | | SOCCER | 8 |
| BMW | 2 OF 10 MINUTES | CARS | 5 |
| | | ECONOMIC STRATA-HIGH | 6 |
| ISAAC ASIMOV | 5 OF 6 MINUTES | BOOKS | 6 |
| | | SCIENCE FICTION | 8 |

FIG.4

INFORMATION PROVISION OVER A NETWORK BASED ON A USER'S PROFILE

TECHNICAL FIELD OF THE INVENTION

The present invention relates generally to providing information via networked environments and, in particular, to providing information, tailored for a user, via the Internet, an Intranet, an Extranet, or the like.

BACKGROUND ART

Internet web sites display many different types of information to Internet users. Depending on the nature of the web site, users may be provided with news or sports headlines, weather updates, product information and pricing, opinions on general interest topics, and detailed discussions pertaining to special interest groups. Virtually every conceivable topic of interest has at least one web site dedicated to the topic. Furthermore, web sites more and more display numerous advertising banners and associated links.

Just as there are many and varied sites on the Internet, there is a corresponding variety of Internet users. People accessing the Internet vary widely in age, occupation, income, education, culture and interests. Advertising material promoted on a web site may be of little interest or relevance to the user. The result is that the user ignores the advertising or may even be sufficiently perturbed by its content to avoid future visits to the site. The content provided may even be offensive to certain people accessing a particular site.

Thus, a need clearly exists for the capability of providing material via the Internet to suit a user.

SUMMARY OF THE INVENTION

According to the invention, this is achieved by generating a profile of the user, and providing information, such as advertisements or content, based upon that profile.

According to a first aspect of the invention, there is provided a method for providing information via a public network to a user, the method comprising the steps of:

identifying the user;

acquiring a user's network usage data;

generating a user profile from said acquired data; and providing information obtained via the network to said user based on a said user profile.

According to a second aspect of the invention, there is provided a server system for providing information via a public network to a user, comprising:

means for identifying a user;

means for acquiring a user's network usage data;

means for generating a user profile from said acquired data;

and wherein said server system provides information, obtained via said network, to said user based on a said user profile.

According to a third aspect of the invention, there is provided a computer program product comprising computer program code on a storage medium, said computer program code including:

a code element for identifying a user;

a code element for acquiring a user's network usage;

a code element for generating a user profile from said acquired data; and a code element for providing information, obtained from a public network, to said user based on said user profile.

In the event that the user is identified specifically, the user is served advertisements based upon the user's profile. The user may be identified by way of fingerprints, retinal pattern or voice pattern.

In the event that the user is identified only as a member of a demographic, the user is provided information suited to the profile. The user may be identified by processing of a video image of a portion of the user's body, including the head.

BRIEF DESCRIPTION OF THE DRAWINGS

Embodiments of the present invention are described hereinafter with reference to the drawings, in which:

FIG. 3 is a table of attributes stored in a user's profile, in accordance with an embodiment of the present invention;

FIG. 4 is a table of mappings between keywords and user attributes, in accordance with a preferred embodiment.

DETAILED DESCRIPTION INCLUDING BEST MODE

Figure 1:
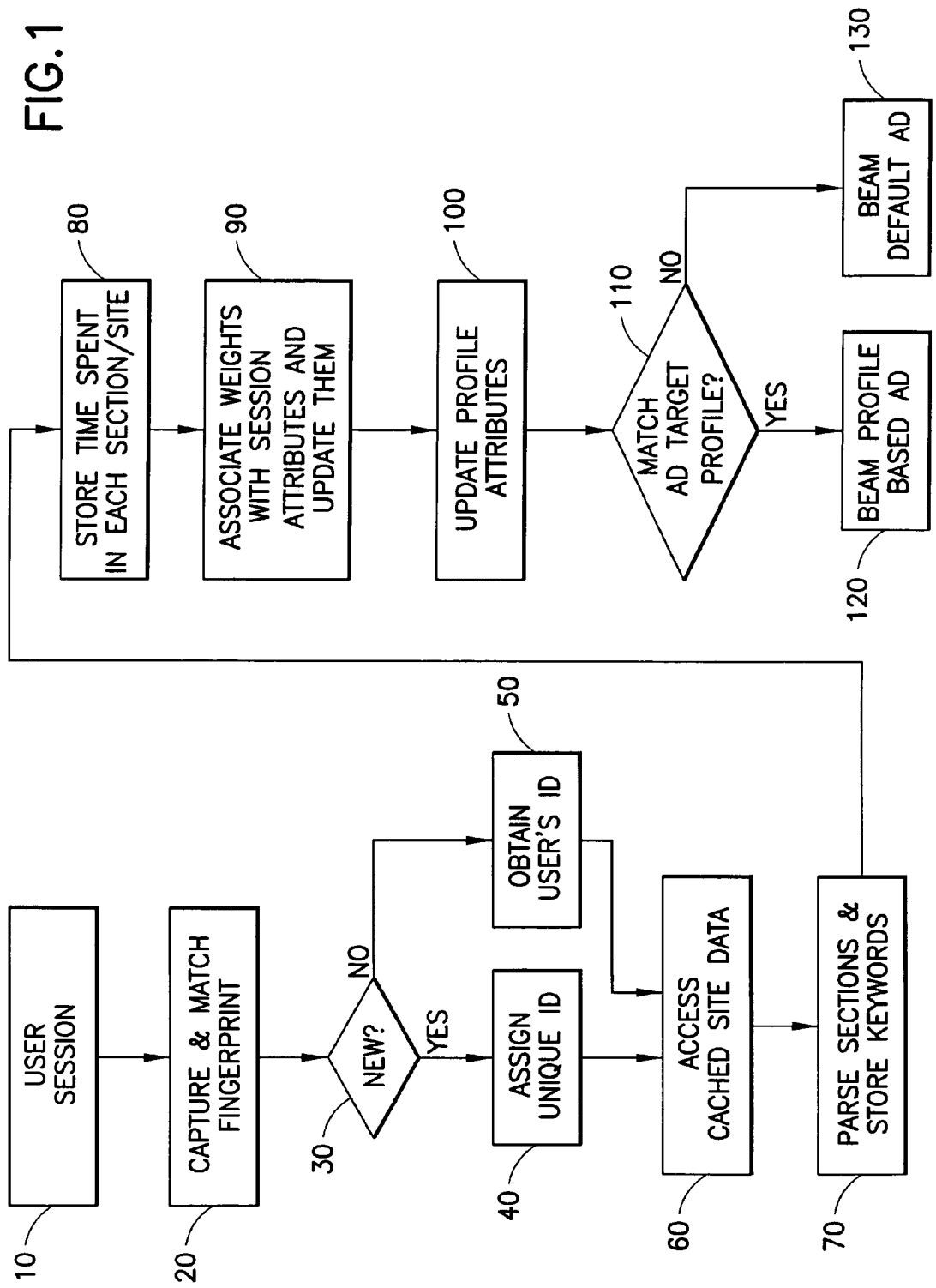
FIG. 1 is a flow diagram of a method of tailoring advertising to suit a user, in accordance with an embodiment of the present invention.

A method, apparatus and computer based product are disclosed for acquiring an Internet user's network usage data, generating a user profile therefrom, and providing content information via the Internet based the user's profile. Depending upon whether the user is identified specifically (i.e. as an individual) or as part of a demographic, then the information served will be different.

Where reference is made in any one or more of the accompanying drawings to steps and/or features, which have the same reference numerals, those steps and/or features have for the purposes of this description the same function (s) or operation(s), unless the contrary intention appears.

The principles of the preferred method described herein have general applicability to the provision of content via public networked environments. However, for ease of explanation, the steps of the preferred method are described with reference to advertising content on the Internet. However, it is not intended that the present invention be limited to the described method. For example, the invention may have application to providing information to suit a user's age group or educational level when searching for reference material in a database.

Acquiring a user's network usage information is performed by recording details about sites the user searches or has visited. More specifically, section headings and keywords off sites visited or searched can be recorded. This recorded information is allocated to one or more attribute records. The attributes are pre-defined. Typically, the attributes are selected from the group consisting of economic stratum, age group, sex, educational background, occupation, religious background, personal technical interests and personal special interests. Each instance of acquired data is weighted with reference to its allocated attributes, and from this the user profile can be generated. The weighting can be performed on the basis of time spent, or the frequency of visits to various sites. Their users profile can be continuously updated with subsequent usage (i.e., sessions).

The user profile can be specific to an individual person, and in that case requires the acquisition of identification data from the user. Such data can be acquired by one or more of the processes of acquiring a user's fingerprint, acquiring a user's retinal pattern or acquiring a user's voice pattern. Alternatively, the user's profile can be specific only to a demographic grouping, and the identification data is broadly characterising. Such characterising identification data can be obtained by capturing a video image of a portion of the user's body, including the head. Such video information is processed to extract information which includes one or more of sex and age.

The information provided to the user on the basis of his or her profile can be advertisements or other information, as noted above.

User Profile—Specific Individual User

FIG. 1 shows a flowchart of an embodiment of the method of the invention, relating to a specific individual user case (i.e., identifying a user individually). A user session 10 begins with a user utilising a computer to access the Internet. The user's fingerprints are captured in step 20. The fingerprints may be optionally acquired by a scanning device located in the computer keyboard or, alternatively, in the computer mouse. Such scanning may be undertaken using the photocell prism technique that is well known in the art and is disclosed, for example, in U.S. Pat. No. 4,455,083 (issued to Paul B. Elmes, issued on Jun. 19, 1984). Other techniques and equipment for acquiring fingerprints, as would be apparent to one skilled in the art, may be used without departing from the spirit and scope of the invention.

The acquired fingerprints are passed to application software or a browser using an enhanced computer mouse or keyboard device driver. An attempt is made by the application software to match the acquired fingerprints with known sets of fingerprints in step 20. Preferably, the known sets of fingerprints are stored in a database. The database is preferably located on a server. A determination is made in step 30 as to whether the user is new or already known to the system. If the user is new, a unique identifier is assigned to the user in step 40. If the user is recognised as being known to the system, the user's existing identifier is retrieved in step 50, using the matched fingerprints from step 20.

As the user navigates the Internet and browses various sites, the content of each site visited is stored in a cache in step 60. Storing each visited site in cache allows data to be extracted from each site in step 70, whilst the user session continues. Each site which a user visits is parsed; section headings and words in bold type are identified and stored as keywords in a database. The time spent at each site, and within sections of a site, is logged in step 80. An embodiment of the invention captures user data over time in an unobtrusive manner; information is not solicited from the user. The user may optionally provide fingerprint and user profile information and where a fingerprint database containing user profiles and background exists, the advertising can be tailored more accurately to suit the user's profile. This is particularly the case when such a fingerprint database is, or can communicate with, a centralised database containing Social Security numbers or credit profiles. It is to be noted, however, that such extended functionality is subject to privacy laws applicable in the region.

Various session and profile attributes associated with a user are defined. These may include economic/social stratum, age group, sex, educational background, occupation/profession, religious background and special interests or hobbies.

Having accumulated data in steps 70 and 80 pertaining to the type of Internet sites visited and the length of time spent at each site, weights are assigned in step 90 to various session attributes. The weights are used as a determination of the user's level of interest in each session attribute and may be derived from time spent in particular sections in specific sites in a particular session. Thus, a high level of interest in a particular session attribute may result in a weight of "10" being assigned to that attribute, whereas an attribute in which the user has little or no interest may result in a weight of "1".

The identifier associated with the user in steps 40 and 50 is used to associate the user with a profile. Having assigned weights to various session attributes in step 90, the attributes in the user's profile are updated in step 100. By accumulating data over a number of sessions, the user's profile may become quite detailed and accurately identify the user's tastes and interests.

A determination is made in step 110 as to whether the user's profile matches a target profile for particular advertising to be displayed on the Internet site currently being visited by the user. If the user's profile does match the desired advertising profile, a tailored advertisement is presented to the user in step 120. As the advertisement directly appeals to the user's profile, including interest and budget, more sales typically result. If the user's profile does not match the advertising profile, a generic advertisement may be presented to the user in step 130.

Once a user has a profile stored in the system, all future connections to the Internet may be tailored in accordance with the user's known interests. Furthermore, future visits to Internet sites ensure that the user's profile is continually updated and refined so that the advertising directly targets the user's current interests and spending patterns.

It will be apparent to one skilled in the art that further embodiments may be practised using retinal scans or voice recognition to uniquely identify the user. In the above example, an individual user's profile was constructed and updated by monitoring the user's internet usage.

Figure 2:
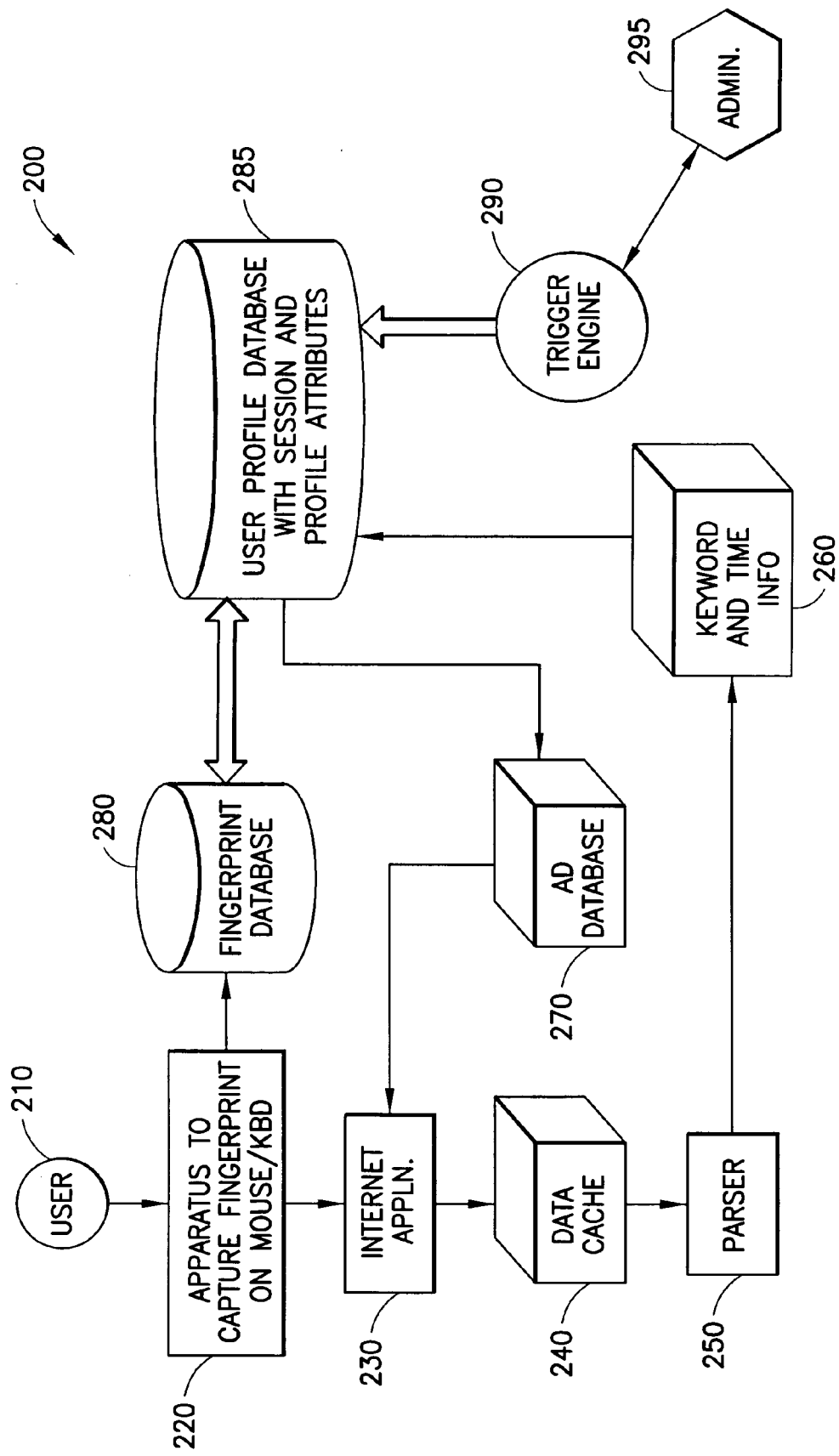
FIG. 2 is a schematic block diagram representation of an apparatus in accordance with an embodiment of the present invention.

FIG. 2 is a schematic block diagram representation of an apparatus in accordance with an embodiment of the invention. A user 210 interacts with a module 220, which in a preferred embodiment is an enhanced keyboard or computer mouse. The module 220 includes means for acquiring the user's fingerprints. Having acquired the user's fingerprints, the module 220 sends a query to a fingerprint database 280 to determine whether the user 210 is known to the system 200. The fingerprint database 280 interacts with a user profile database 285 via a duplex connection. The user profile database 285 stores session and profile attributes specific to identifiable users. The user profile database 285 provides information to an Ad database 270. The Ad database 270 uses the information from the user profile database 285 to customise advertising which is to be displayed on Internet web sites.

The module 220 also interacts with an Internet Application 230. The Internet Application 230 is used to navigate among different web sites on the Internet. The Internet Application 230 receives customised advertising from the Ad database 270.

Each site visited by the user 210 using the Internet Application 230 is stored in a data cache 240. The data cache 240 supplies the content from the web sites visited by the user 210 to a parser 250. The parser 250 identifies section headings and highlighted text as keywords. The parser 250 also monitors the time the user 210 spends at each web site visited. The parser 250 provides the keywords and timing information to the keyword and time information entity 260. The keyword and time information entity 260 provides information to the user profile database 285 to update the user's profile and session attributes.

A preferred embodiment of the invention may optionally include a trigger engine 290 to update users' session attributes stored in the user profile database 285. The trigger engine 290 can skew the weights associated with session attributes for all or individually identified users. The trigger engine 290 identifies universal trends across session attributes of many users. These could be influenced by local, national or international events pertaining to sport, politics, or weather. The trigger engine 290, on identifying universal trends, may optionally interact with an administrator 295 so that appropriate manual correction of user profiles may be made.

FIG. 3 is a table of attributes depicting a sample user profile derived over a period of five sessions. The fields are only illustrative and should not be considered as a limitation. Furthermore, each attribute may optionally be associated with sub-attributes and profile and session values. The first column of the table shows seven profile traits: economic strata, age group, gender, educational background, technical interest, profession and special interests. These profile traits are divided into a number of attributes, which appear in the second column. For example, the economic strata profile trait is divided into attributes of very high, high, medium, low and very low. Similarly, special interests are divided into movies, music, sport, stamps, coins, paintings, travel and photography.

A weighting, described as the profile attribute value, is associated with each attribute and appears in the third column. The weightings are derived from the session attribute values, acquired over five sessions, which appear in the next five columns. In each session, a weight is assigned to each attribute relevant to the specific session.

Examining the profile trait "gender", it is readily seen that the possible attributes are male and female. In each of the five sessions, relatively high weights were assigned to the attribute female. The attribute male was only assigned weights in two of the five sessions, and the weights assigned were relatively low. The weights are assigned based on the amount of time spent at sites which are classified as appealing to males or females, respectively. It appears very likely from the data that the user is a female.

In the first session, a weight of "9" was assigned to the attribute "Movies", indicating that the user spent a significant amount of the user session looking at movie related web sites. No weight was assigned to the Attribute "Movies" for the second session, indicating that no relevant web site was visited. The third, fourth and fifth user session also recorded weights of "9" for "Movies", indicating that the user has a strong interest in movies. The Profile Attribute Value stored in the user profile is, therefore, "9", indicating a high overall interest in movie-related web sites. The user visited a stamp-related site briefly in the first session and has not visited a stamp-related site in the succeeding sessions, so the Profile Attribute Value for "Stamps" is "1", indicating an overall low interest in that topic. Advertisers are able to use this information and customise the advertising presented to the user via the Internet. For example, the advertising banners on a search engine may display information about new release movies or videos and associated merchandising.

FIG. 4 is a table showing the mapping of keywords to user attributes for a sample user. Keywords are extracted by a parser from web site content stored in a cache. In the first row of the table, the word "Camera" was identified as a keyword and the user spent 5 of 15 minutes on web sites or in sections of web sites containing the keyword. The keyword "camera" is mapped to the special interest attribute of photography and is assigned a weight of 6, based on the relative time spent by the user at sites containing the keyword "camera".

The third keyword "Maradona" is mapped to the attributes "Sport" and "Soccer". Appropriate weightings are then assigned based on the time spent visiting sites containing the keyword "Maradona". As soccer is more specific than sport, it receives a slightly higher weight as a measure of the user's specific interest in soccer. Similarly, the keyword "BMW" is mapped to the attributes "Cars" and "Economic Strata—High" and relevant weights assigned.

User Profile—Demographic Grouping

In the case where a user is identified only by a demographic grouping, then user characterising data is acquired. This is done, in one preferred form, by capturing a video image of the user's body, including the head, from which demographic information can be discerned.

Techniques of facial recognition will be known to those skilled in the art, as will be the processes associated with discriminating an individual into one or more demographic groupings. Such techniques are herein incorporated by cross-reference.

In embodiments in which individual users are categorised as belonging to a particular demographic, the Internet usage patterns of all users within the same demography contribute to the construction of that demographic's profile, and thus to the style and content of advertising that will be presented to all members of the demographic.

The teaching given above relating to the acquisition of usage data, generation of a user profile, and updating thereof with continuing usage is equally applicable here.

Consider the following demographic groupings: Adult, Child, Male, Female, Adolescent, Student and Professional. Any single user will be grouped into at least two of these profiles. The manner in which advertisement URLs are mapped to each grouping is to (i) associate URLs which contain the group name as a part of the URL, (ii) associate URLs which are synonyms of the group name, or (iii) associate URLs which are already established in the electronic media or in authorized resources as being targetted to this demographic group (i.e. the 'URL.com' may have an advertisement.).

The allocation of a user to particular demographic groups can also be weighted in accordance with the user's level of interest in specific sites, as discussed above.

An advantage of the invention is that owners and operators of Internet web sites are able to attract more sources of advertising based on the operators' ability to deliver dynamic target audiences. By consulting with companies wishing to advertise their goods and/or services, web site operators are able to assign a profile to each good or service being promoted. Goods and services may then be matched to a user's profile to ensure that a company with a range of products catering to different demographics is able to promote the product which best suits the user.

As many user profiles are generated over time, important statistical analyses can be performed using the acquired data. This may be used to further tailor the advertising content presented to different web sites.

Figure 5:
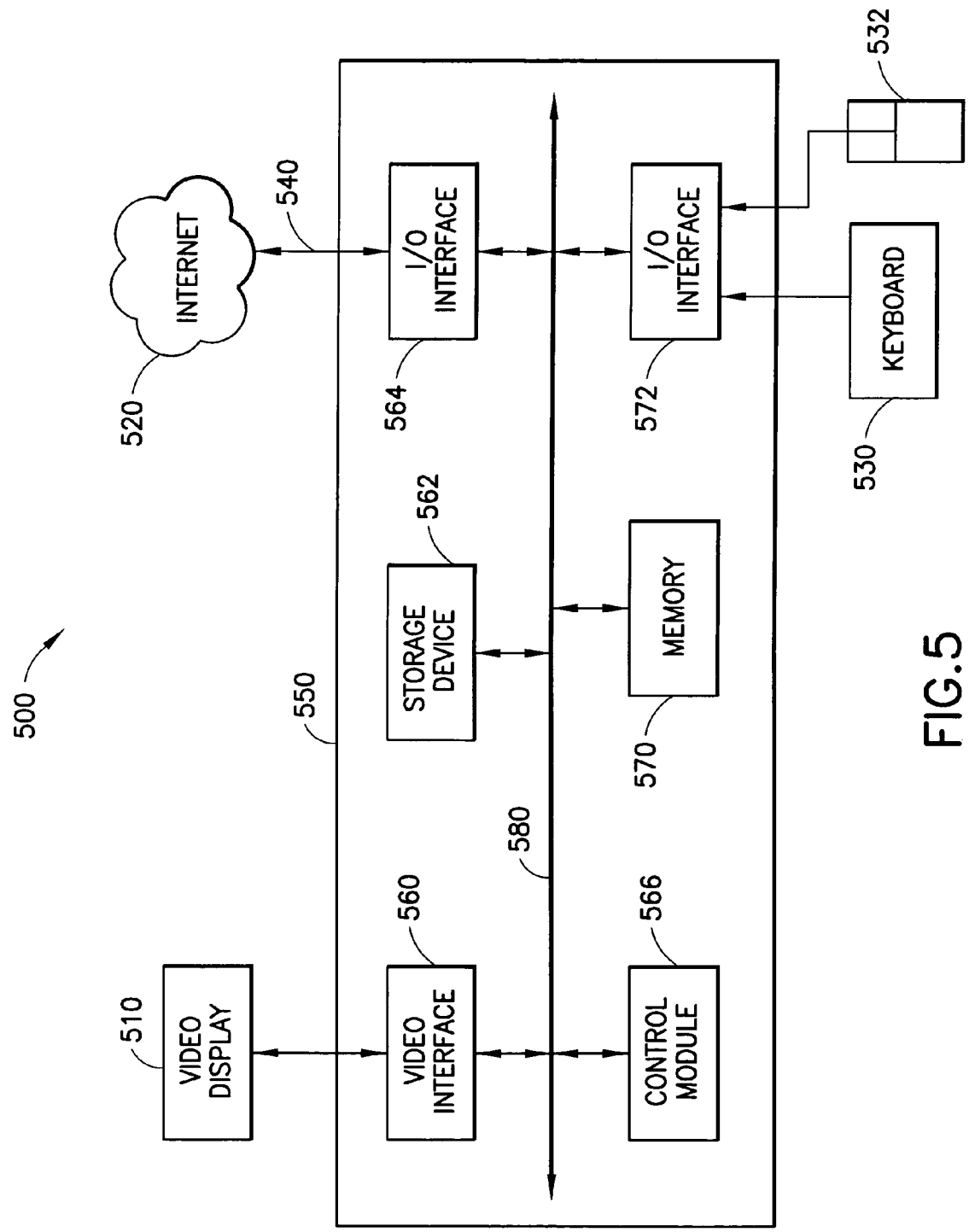
FIG. 5 is a computer platform upon which the invention may be practised.

The process for providing tailored information for a user via the Internet can be implemented using a computer program product in conjunction with a computer system 500 as shown in FIG. 5. In particular, the apparatus for acquiring a user's profile data, associating the acquired data with a user profile and providing information to the user based on the associated user profile can be implemented as software, or computer readable program code, executing on the computer system 500.

The computer system 500 includes a computer 550, a video display 510, and input devices 530, 532. In addition, the computer system 500 can have any of a number of other output devices including line printers, laser printers, plotters, and other reproduction devices connected to the computer 550. The computer system 500 can be connected to one or more other computers via a communication input/output (I/O) interface 564 using an appropriate communication channel 540 such as a modem communications path, an electronic network, or the like. The network may include a local area network (LAN), a wide area network (WAN), an Intranet, and/or the Internet 520.

The computer 550 includes the control module 566, a memory 570 that may include random access memory (RAM) and read-only memory (ROM), input/output (I/O) interfaces 564, 572, a video interface 560, and one or more storage devices generally represented by the storage device 562. The control module 566 is implemented using a central processing unit (CPU) that executes or runs a computer readable program code that performs a particular function or related set of functions.

The video interface 560 is connected to the video display 510 and provides video signals from the computer 550 for display on the video display 510. User input to operate the computer 550 can be provided by one or more of the input devices 530, 532 via the I/O interface 572. For example, a user of the computer 550 can use a keyboard as I/O interface 530 and/or a pointing device such as a mouse as I/O interface 532. The keyboard and the mouse provide input to the computer 550. In a first embodiment, the user's fingerprints may be acquired via a scanning device located in either one or both of the keyboard and the mouse. In a second embodiment, the user's voice pattern may be acquired via a sound card equipped with digital signal processing software located in the computer 550. In a third embodiment, the user's retina may be scanned by a scanning device connected to the computer 550. In a fourth embodiment, a video camera connected to the computer 550 may be used to capture a video image of the user.

The storage device 562 can consist of one or more of the following: a floppy disk, a hard disk drive, a magneto-optical disk drive, CD-ROM, magnetic tape or any other of a number of non-volatile storage devices well known to those skilled in the art. Each of the elements in the computer system 550 is typically connected to other devices via a bus 580 that in turn can consist of data, address, and control buses.

In particular, the software may be stored in a computer readable medium, including the storage device 562 or that is downloaded from a remote location via the interface 564 and communications channel 540 from the Internet 520 or another network location or site. The computer system 500 includes the computer readable medium having such software or program code recorded such that instructions of the software or the program code can be carried out. The use of the computer system 500 preferably effects advantageous apparatuses for constructing a runtime symbol table for a computer program in accordance with the embodiments of the invention.

The computer system 500 is provided for illustrative purposes and other configurations can be employed without departing from the scope and spirit of the invention. The foregoing is merely an example of the types of computers or computer systems with which the embodiments of the invention may be practised. Typically, the processes of the embodiments are resident as software or a computer readable program code recorded on a hard disk drive as the computer readable medium, and read and controlled using the control module 566. Intermediate storage of the program code and any data including entities, tickets, and the like may be accomplished using the memory 570, possibly in concert with the storage device 562.

In some instances, the program may be supplied to the user encoded on a CD-ROM or a floppy disk (both generally depicted by the storage device 562), or alternatively could be read by the user from the network via a modem device connected to the computer 550. Still further, the computer system 500 can load the software from other computer readable media. This may include magnetic tape, a ROM or integrated circuit, a magneto-optical disk, a radio or infrared transmission channel between the computer and another device, a computer readable card such as a PCMCIA card, and the Internet 520 and Intranets including email transmissions and information recorded on Internet sites and the like. The foregoing are merely examples of relevant computer readable media. Other computer readable media may be practised without departing from the scope and spirit of the invention.

The apparatus for acquiring users' profile data and providing information to the user based on the associated user profile can be realised in a centralised fashion in one computer system 500, or in a distributed fashion where different elements are spread across several interconnected computer systems.

Computer program means or computer program in the present context mean any expression, in any language, code or notation, of a set of instructions intended to cause a system having an information processing capability to perform a particular function either directly or after either or both of the following: a) conversion to another language, code or notation or b) reproduction in a different material form.

The foregoing describes only some embodiments of the present invention, and modifications and/or changes can be made thereto without departing from the scope and spirit of the invention, the embodiments being illustrative and not restrictive.

I claim:

1. A method for providing information via a public network to a user, the method comprising the steps of:
   identifying the user;
   acquiring data from each site searched or visited by the user during each session of a plurality of sessions via the public network, said acquired data comprising content of each site searched or visited during each said session;
   for each said site searched or visited for each said session:
      parsing the acquired data to identify session attributes for each site searched or visited and associating a session weight with each said session attribute of each site searched or visited, wherein the session attributes for each site searched or visited are derived from keywords consisting of section headings and bolded words in the acquired data of each site searched or visited, and wherein each session weight of each site searched or visited is derived from the time spent by the user in each site searched or visited or from a frequency of visits by the user to each site searched or visited;

specifying user profile attributes for the user;
providing a mapping that associates each session attribute with a corresponding user profile attribute;
for each user profile attribute:
  determining a user profile weight derived from session weights associated with session attributes corresponding to the user set profile attribute in accordance with said mapping;
generating a user profile pertaining to the user, said user profile including one or more attribute records, each attribute record of said one or more attribute records comprising: a user profile attribute of said user profile attributes, the user profile weight associated with the user profile attribute, and the session weights associated with the user profile attribute; and
providing information obtained via the network to said user based on said user profile.

2. The method of claim 1, wherein said step of identifying said user includes one or more of the steps of:
acquiring fingerprints of the user;
acquiring a retinal pattern of the user; and
acquiring a voice pattern of the user.

3. The method of claim 1, wherein said providing information step comprises directing advertising to the user based on the user profile.

4. The method of claim 1, further comprising recording said keywords.

5. The method of claim 4, wherein said recording said keywords comprises storing said keywords in a cache.

6. The method of claim 1, wherein said user profile attributes are selected from the group consisting of economic stratum, age group, sex, educational background, occupation, religious background, personal technical interests, and combinations thereof.

7. The method of claim 1, wherein said user profile attributes comprise personal special interests.

8. The method of claim 1, wherein said user profile is continuously updated with usage of the public network by the user.

9. The method of claim 1, wherein said step of identifying said user includes identifying a demographic grouping to which said user belongs, wherein said identifying said demographic grouping includes capturing a video image of a portion of the body of said user, and wherein said portion of the body of said user includes the head of the user.

10. A server system for providing information via a public network to a user, comprising:
means for identifying the user;
means for acquiring data from each site searched or visited by the user during each session of a plurality of sessions via the public network, said acquired data comprising content of each site searched or visited during each said session;
for each said site searched or visited for each said session:
  means for parsing the acquired data to identify session attributes for each site searched or visited and associating a session weight with each said session attribute of each site searched or visited, wherein the session attributes for each site searched or visited are derived from keywords consisting of section headings and bolded words in the acquired data of each site searched or visited, and wherein each session weight of each site searched or visited is derived from the time spent by the user in each site searched or visited or from a frequency of visits by the user to each site searched or visited;
means for specifying user profile attributes for the user;
means for providing a mapping that associates each session attribute with a corresponding user profile attribute;
for each user profile attribute:
  means for determining a user profile weight derived from session weights associated with session attributes corresponding to the user profile attribute in accordance with said mapping;
means for generating a user profile pertaining to the user, said user profile including one or more attribute records, each attribute record of said one or more attribute records comprising:
  a user profile attribute of said user profile attributes, the user profile weight associated with the user profile attribute, and the session weights associated with the user profile attribute; and
means for providing information obtained via the network to said user based on said user profile.

11. The server system of claim 10, wherein said means for identifying includes means for identifying a demographic grouping to which said user belongs, wherein said means for identifying said demographic grouping includes means for capturing a video image of a portion of the body of said user, and wherein said portion of the body of said user includes the head of the user.

12. The server system of claim 10, further comprising means for recording said keywords.

13. The server system of claim 12, wherein said means for recording said keywords comprises means for storing said keywords in a cache.

14. The server system of claim 10, wherein said user profile attributes are selected from the group consisting of economic stratum, age group, sex, educational background, occupation, religious background, personal technical interests, and combinations thereof.

15. A computer program product comprising a computer usable medium having a computer readable program code embodied therein, said computer readable program code comprising an algorithm adapted to implement a method for providing information via a public network to a user, said method comprising the steps of:
identifying the user;
acquiring data from each site searched or visited by the user during each session of a plurality of sessions via the public network, said acquired data comprising content of each site searched or visited during each said session;
for each said site searched or visited for each said session:
  parsing the acquired data to identify session attributes for each site searched or visited and associating a session weight with each said session attribute of each site searched or visited, wherein the session attributes for each site searched or visited are derived from keywords consisting of section headings and bolded words in the acquired data of each site searched or visited, and wherein each session weight of each site searched or visited is derived from the time spent by the user in each site searched or visited or from a frequency of visits by the user to each site searched or visited;
specifying user profile attributes for the user;
providing a mapping that associates each session attribute with a corresponding user profile attribute;

for each user profile attribute:
- determining a user profile weight derived from session weights associated with session attributes corresponding to the user profile attribute in accordance with said mapping;
- generating a user profile pertaining to the user, said user profile including one or more attribute records, each attribute record of said one or more attribute records comprising: a user profile attribute of said user profile attributes, the user profile weight associated with the user profile attribute, and the session weights associated with the user profile attribute; and
- providing information obtained via the network to said user based on said user profile.

16. The computer program product of claim 15, said method further comprising recording said keywords.

17. The computer program product of claim 16, wherein said recording said keywords comprises storing said keywords in a cache.

18. The computer program product of claim 15, wherein said user profile attributes are selected from the group consisting of economic stratum, age group, sex, educational background, occupation, religious background, personal technical interests, and combinations thereof.

19. The computer program product of claim 15, wherein said step of identifying said user includes identifying a demographic grouping to which said user belongs, wherein said identifying said demographic grouping includes capturing a video image of a portion of the body of said user, and wherein said portion of the body of said user includes the head of the user.

* * * * *